United States Patent
Bianchi

Patent Number: 5,462,411
Date of Patent: Oct. 31, 1995

[54] DEVICE FOR CONNECTING BLADES TO A HUB

[75] Inventor: Emilio Bianchi, Lugano-Paradiso, Switzerland

[73] Assignee: Ceute S.A., Lugano, Switzerland

[21] Appl. No.: 244,780

[22] PCT Filed: Oct. 13, 1993

[86] PCT No.: PCT/EP93/02815

§ 371 Date: Jun. 10, 1994

§ 102(e) Date: Jun. 10, 1994

[87] PCT Pub. No.: WO94/09277

PCT Pub. Date: Apr. 28, 1994

[30] Foreign Application Priority Data

Oct. 19, 1992 [CH] Switzerland ............... 3233/92

[51] Int. Cl.⁶ ............................... F04D 29/38
[52] U.S. Cl. ............. 416/202; 416/204 R; 416/205; 416/210 R; 416/219 A
[58] Field of Search .......... 416/204 R, 204 A, 416/210 R, 210 A, 219 R, 219 A, 238, 239, 209, 202, 205, 220 A; 403/332, 333, 334

[56] References Cited

U.S. PATENT DOCUMENTS

| Re. 1,467 | 4/1863 | Perry | 403/334 |
|---|---|---|---|
| 1,567,401 | 12/1925 | Stuart. | |
| 1,878,816 | 9/1932 | Bucklen | 416/239 |
| 2,372,714 | 4/1945 | Effinger, Jr. | 416/220 A |
| 3,480,373 | 11/1969 | Talbot | 416/210 R |
| 4,396,352 | 8/1983 | Pearce. | |

FOREIGN PATENT DOCUMENTS

| 0148641 | 2/1937 | Austria | 416/210 R |
|---|---|---|---|
| 0413633 | 2/1991 | European Pat. Off. . | |
| 2372972 | 6/1978 | France . | |
| 2381926 | 9/1978 | France . | |

Primary Examiner—Edward K. Look
Assistant Examiner—Christopher Verdier
Attorney, Agent, or Firm—Young & Thompson

[57] ABSTRACT

A device for connecting blades (7) to a hub (5) in a propeller of either a fan or an aircraft has a variable fitting in at least a moving position. An L-shaped element (1) connects each blade (7) to the hub (5) so that an attachment of the blade (7) to the hub (5) has a longitudinal axis eccentric with respect to a longitudinal axis of the hub (5). The L-shaped element (1) has a first long leg aligned parallel with a longitudinal axis of the blade (7). The L-shaped element (1) also has a short leg perpendicular to a flat plane of the blade (7) and parallel to a rotational axis of the hub (5). A screw (4) fastens the second short leg of the L-shaped element (1) to the hub (5). This screw (4) is aligned parallel to the flat plane of the blade (7) but has a longitudinal axis spaced from the flat plane of the blade (7). A circular crown (6) presses the L-shaped element (1) to the hub (5) while a hole (3) retains the screw (4) whereby the hole (3) is eccentric with respect to the crown (6). The eccentricity (e) of the hole (3) and the screw (4) with respect to a longitudinal axis of the crown (6) is not less than 10% of an exterior diameter of the crown (6).

5 Claims, 6 Drawing Sheets

DEVICE FOR CONNECTING BLADES TO A HUB

BACKGROUND OF THE INVENTION

1. Field of the Invention

The present invention has as its object an improved device for connecting blades to a hub in propellers of fans, aircraft and other applications, with variable fitting whether in the stopped position or in motion.

2. Description of the Related Art

In the application for European Serial No. 90810598.4 of the same Ceute applicant, published on Feb. 20, 1991 with publication No. 0 413 663 A2 with Argentine priority of Aug. 14, 1989, a device is claimed in which the connection of each blade to the hub took place by means of a screw placed outside the contour of the blade.

The screw acted as a pivot for the variation of the fitting of each blade, by ensuring the mechanical blocking of the blade itself to the hub, at the desired fitting.

In the Italian patent application Serial No. 91A 003500 in the name of Elica s.r.l., filed on Dec. 30, 1991, there is a blade-hub connection that falls within the above-mentioned previous European patent application, inasmuch as the attachment of the blades to the hub, although realized in a different manner, has the longitudinal axis of the screw located outside the contour of each blade (see for example FIGS. 13 and 14 of that patent application).

Both in the device according to the EPO patent application, and in the Italian patent application just cited, the blade was practically not disturbed structurally at the base by maintaining the full resisting section in the areas of maximum bending moment.

The disadvantage of the "Ceute" device was that it had to have hubs large in diameter since each blade, for at least 50% of the span had to be superimposed on the hub.

This arrangement did not constitute a drawback for fans of large diameter, made up of blades characterized by significant slenderness (by slenderness is meant the ratio: radius of the blade/span of the blade): the large diameter hub serves to reduce the length of the blade and thus the stresses, and to create a shield to prevent the reverse flow in the area of the hub.

Obviously, this effect can be obtained in a much less costly way by a simple sheet metal, aluminum or plastic disc.

On the other hand, with small diameter fans, the "Ceute" device would compromise the performance of the fan, since it necessitated a hub of excessive diameter with the resulting necessity of fairing upstream from the hub.

The "Elica" device, in practice, although it reduces costs with respect to the solution just examined inasmuch as the cost of the hub decreases significantly, presents the drawback, for small fans, of exhibiting the bases of the blades that are altered from the aerodynamic standpoint.

The presence of support 15 in FIG. 14 in the "Elica" device significantly alters the aerodynamic field at the base.

Both the "Ceute" and the "Elica" devices can find their field of application for axial fans characterized by a ratio of radial extension of the blade outside the support/radius of the blade itself close to the unit.

This ratio is used for the reasons stated above and especially when the fans are made to operate at a high tip speed.

In this case for equal yield, few blades are required, in addition to the significant slenderness, with the high tip speed compensating for the small surface of the blades.

In the last 10 to 20 years, on the other hand, in countries with a high population density, industrial and civilian plants are required to observe ever stricter norms relating to noise.

For this reason, with equal diameter and equal yield, due to the tip speed of the propellers, the major cause of noise must be significantly reduced and the surface area of the blades must increase at least by the square of the ratio:

$$\left(\frac{62}{45}\right)^2 = (1970\text{'s tip speed}/1990\text{'s tip speed})^2$$

in which 60 and 45 are the tip speeds of the 1970's and 1990's devices in meters/second. Furthermore by increasing the surface area of the blade or to say it more precisely the solidity (understood as the ratio between the surface of the blades and the surface of the fan disc), aerodynamic interference is manifested between one blade and another, and thus axial fans that operate at 45 meters/second in comparison to 60 meters/second in the 1970's devices, exhibit at least twice the surface area of the blade in comparison to that of years past.

Naturally, with equal diameter and yield, in terms of construction, it is more economical to double the span of the blade rather than the number of blades.

Consequently, in the 1990's devices we are dealing with fans characterized by stubby blades (the opposite of "slender") and thus with the capacity to withstand bending moments 8 times greater as compared to the blades of the 1970's.

In fact, by doubling the dimensions, the resisting moment increases with the cube of the dimensions themselves $(2)^3 = 8$, if the span of the 1990's blades is twice the span of the 1970's blades.

Furthermore, modest tip speeds intuitively involve reduced loads, thereby supporting the blades with a simple insert is sufficient even if the blade at the base is disturbed by the holes required to connect the blade to the insert itself using screws.

With this invention, the intention is to combine the advantages of the previous patent, while introducing two important variations which make possible an improvement of the aerodynamic yields and at the same time a significant decrease in cost.

The present invention thus has as its object an improved device that completely fulfills all the requirements specified above.

SUMMARY OF THE INVENTION

The present invention is characterized in that the connection of the blades to the hub is realized by an L-shaped element, the first longer side leg of which is essentially aligned with the longitudinal axis of the blade.

BRIEF DESCRIPTION OF THE DRAWINGS

The attached drawings represent some preferred embodiments of the device according to the present invention, which are neither limiting nor binding.

FIG. 1C represents the corresponding lateral view;

FIG. 1D represents the perspective view of the L-shaped element alone;

DETAILED DESCRIPTION OF THE PREFERRED EMBODIMENTS

With reference to the various figures:

FIGS. 1A, 1B, 1C, and 1D represent, as previously mentioned, a preferred embodiment of the present invention in which the blade-hub connection is realized by element 1 (FIG. 1A) in the shape of an "L" which is inserted into the cavity of a blade 7, and one of its legs is substantially aligned on the longitudinal axis of the blade 7 itself.

Figure 1A:
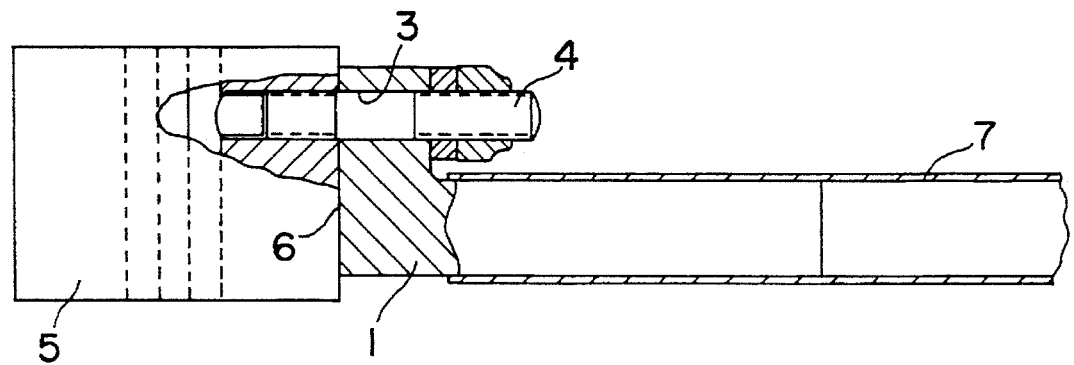
FIG. 1A represents the partial longitudinal section of the connection of a blade of the propeller to the hub by the L-shaped element.
Figure 1B:
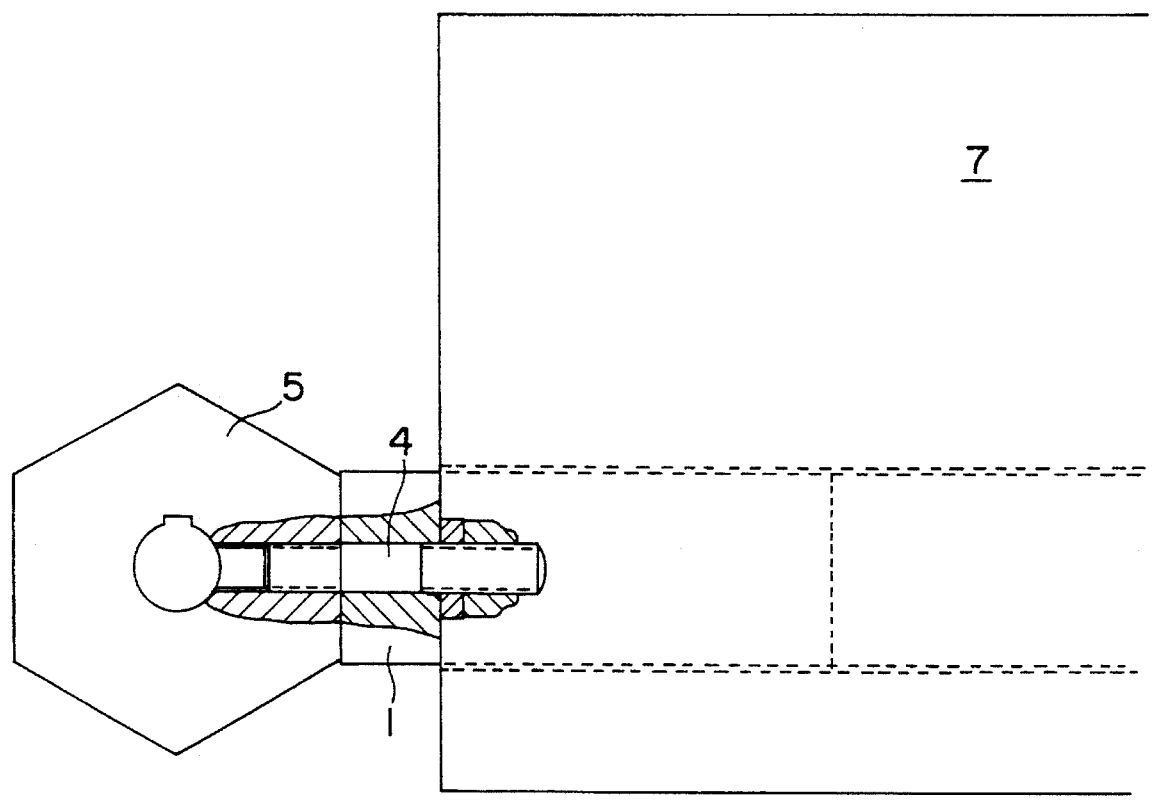
FIG. 1B represents the layout view from above with a sectioned portion.

In the second shorter leg of the L-shaped element 1 placed perpendicular to the plane of the blade 7, hole 3 (FIG. 1D) is made to allow for the passage of a screw 4 which bolts the blade attachment to a hub 5 (FIGS. 1A, 1B and 1C).

To press the attachment of the L-shaped element 1 against the surface of the hub 5, there is provided a circular crown 6 which allows for, with equal tightening of the screw 4, the transfer of a higher bending moment with respect to that which can be transferred to the L-shaped element 1 held compressed by a plane surface.

Figure 2:
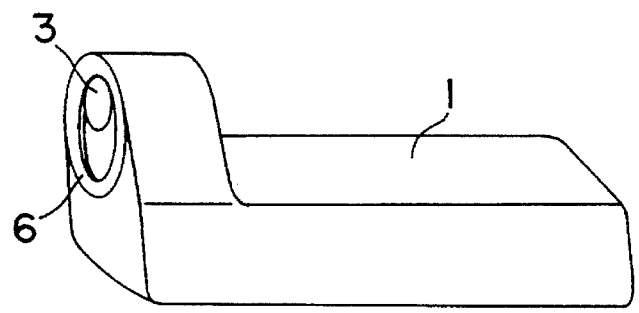
FIG. 2 represents the lateral view of the L-shaped element to show the eccentricity of the hole through which the screw passes which attaches the element to the hub.
Figure 2:
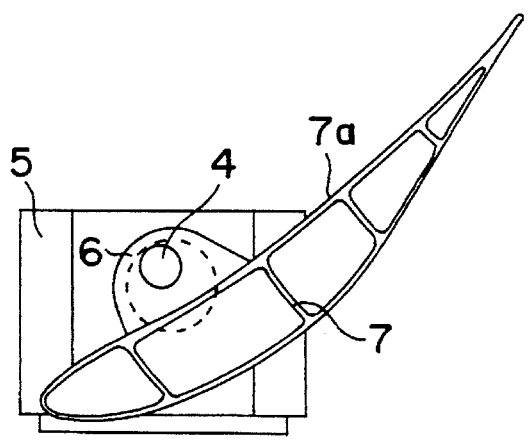
Figure 2:
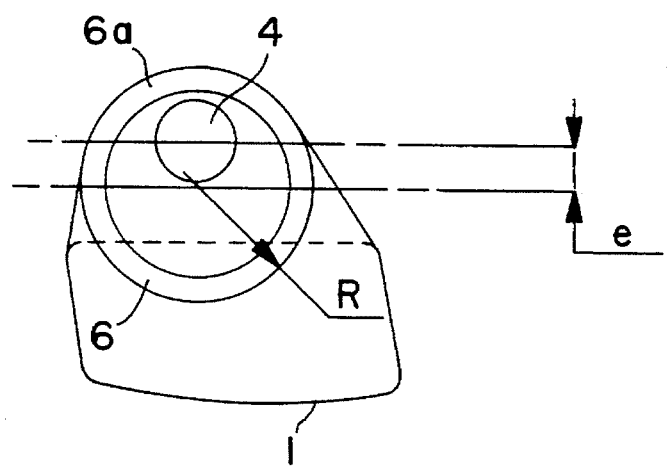

Hole 3 of screw 4 is not concentric with the circular crown 6, although it is displaced in the area along the diameter of the crown 6 itself in which the crown 6 has the greatest tendency to "work loose" from the surface of the hub 5 (FIG. 2) by the effect of the moment generated by the aerodynamic action.

Figure 3A:
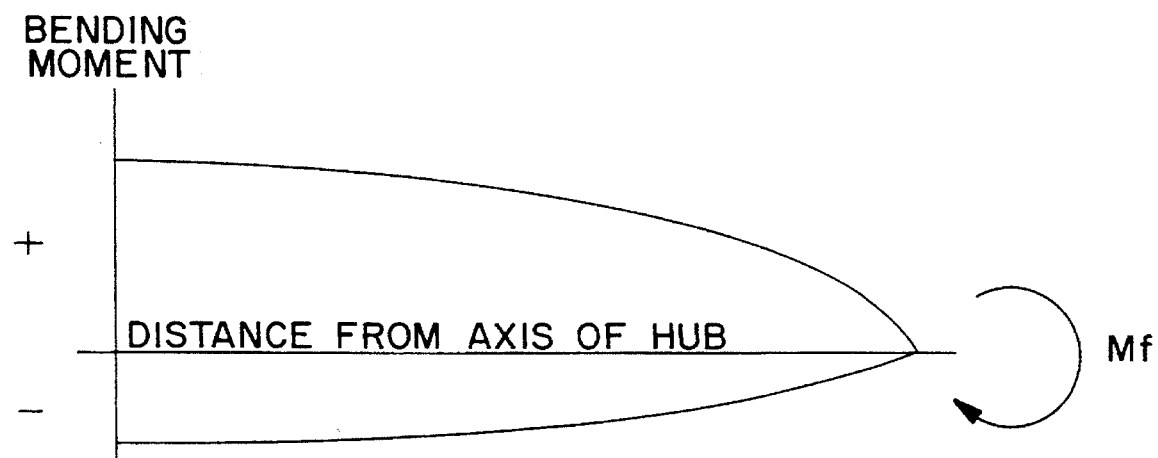
FIG. 3A represents the diagram of the moments bending the blade as a function of distance R from the axis of the hub.
Figure 3B:
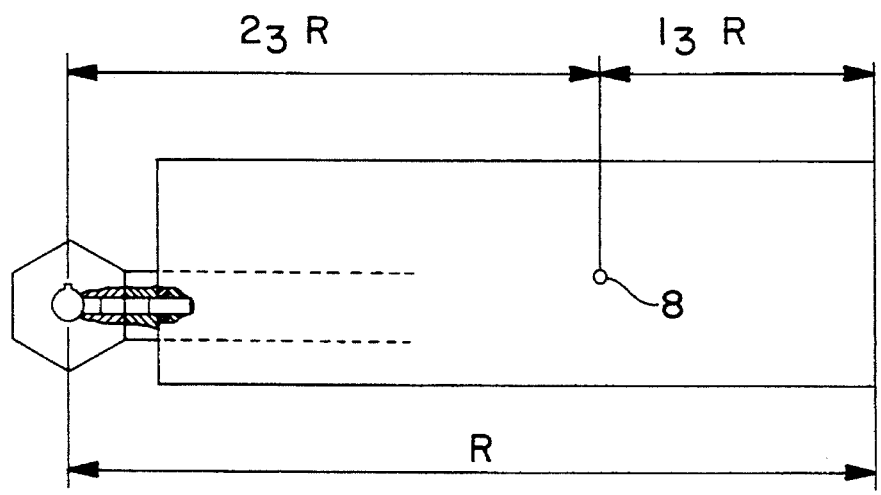
FIG. 3B represents an outline of the blade/hub layout to which the diagram of FIG. 3A refers.
Figure 3C:
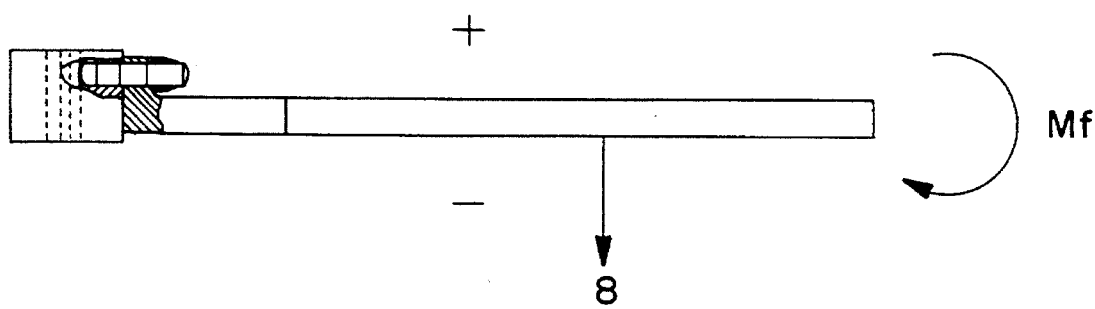
FIG. 3C represents the stresses and the bending moments impinging on the blade/hub unit outlined in a lateral view.

In fact, the blades 7 of the fan in operation create in the area of belly 7a (FIG. 1C) of the profile an excess pressure (marked with + in FIG. 3C) with a resulting load 8 on the blades 7 acting in an opposite direction and having a relative bending moment Mf, the stresses of which are represented in FIGS. 3A, 3B and 3C.

From practical tests carried out with extensimetric profiles it is confirmed that: (see FIGS. 3A, 3B, 3C): to an oscillating moment due to aerodynamic distances on the blades 7, such as nonuniformity of flow and/or interferences with supports, there is superimposed a bending moment caused by the jump in pressure that is manifested corresponding to the disk of the fan.

In a first rough approximation it can be assumed that the aerodynamic lead 8 applied to the blades 7 is localized at ⅔ of the radius.

From this calculation a "constant" moment derives that is to be superimposed on the oscillating moment.

As already stated, the circular crown 6 (FIG. 1D) placed in correspondence to the blade attachment, pressed by the screw 4 against the plane surface of the hub 5, transmits a bending moment in the manner described.

Since the oscillating bending moment is not symmetrical to the base of the blade 7, this situation brings with it the advantage of carrying by means of eccentricity "e" (FIG. 2) the axis of tightening the screw 4 as close as possible to a part 6a of the circular crown 6 which has the greatest tendency to work loose from the surface of the hub 5 (greater bending moment as an absolute value). Naturally, the modulus of elasticity of the materials (hub, blade attachment, screw), the sections of the elements in play (thickness in the radial sense of the attachment, diameter of the screw, etc.) will give, to whoever is programming the fan, the most suitable position for stabilizing disalignment "e" of the screw 4 with respect to the circular crown 6.

In practice this disalignment (or eccentricity) e should be not less than 10% of the exterior diameter of the crown 6.

It should be clear that such a solution of the blade-hub connection can be realized with the blades 7 not necessarily extruded from aluminum, but also with cast blades, made of injected plastic materials, obtained from compound materials, as long as the L-shaped element 1, installed as one piece with the blade 7 or installed within the contour of the blade 7 creates the conditions stated above.

Figure 4A:
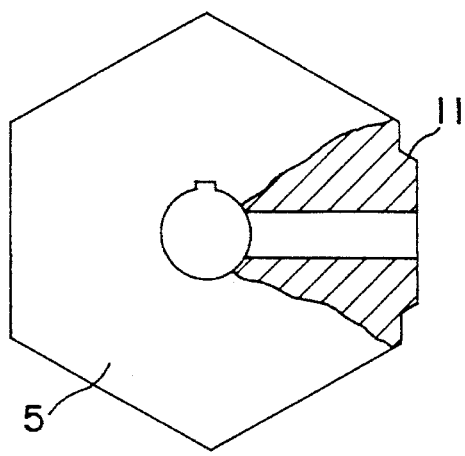
FIG. 4A represents a variant in the attachment of the blades to the hub in a partial transverse section.
Figure 4B:
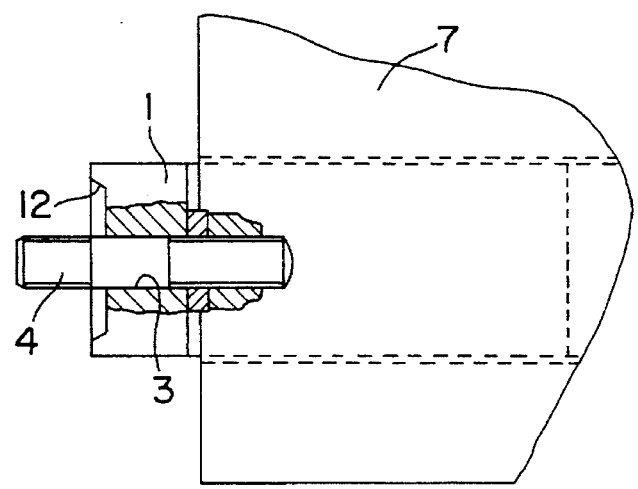
FIG. 4B represents the same variant in a partial longitudinal section.
Figure 5B:
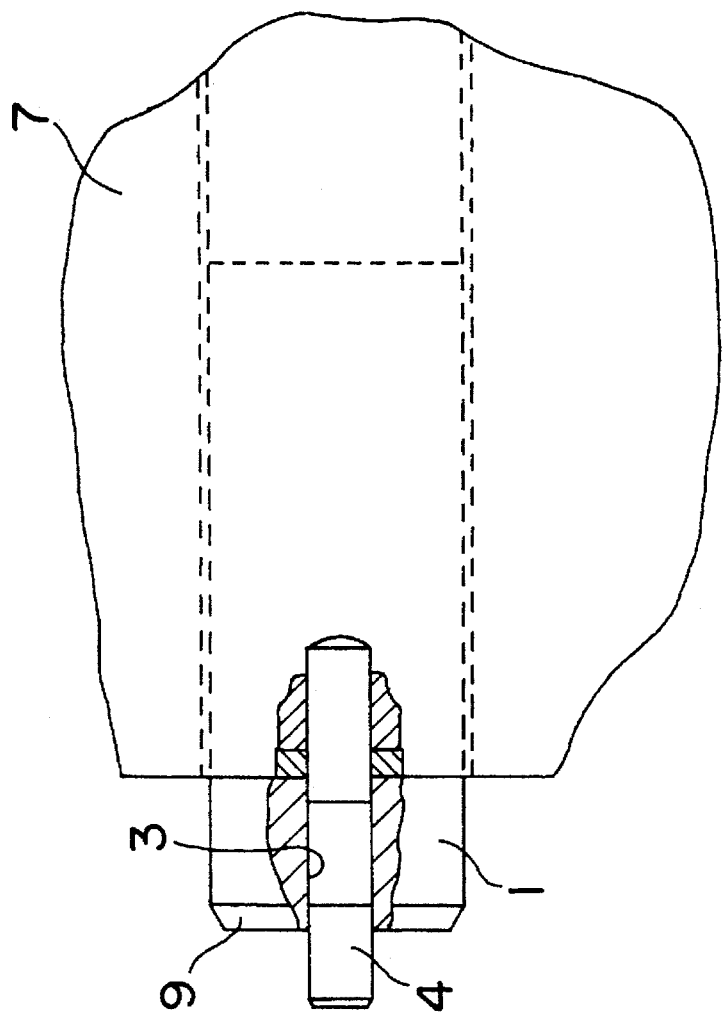
FIG. 5B represents the same variant in a partial longitudinal section.
Figure 5A:
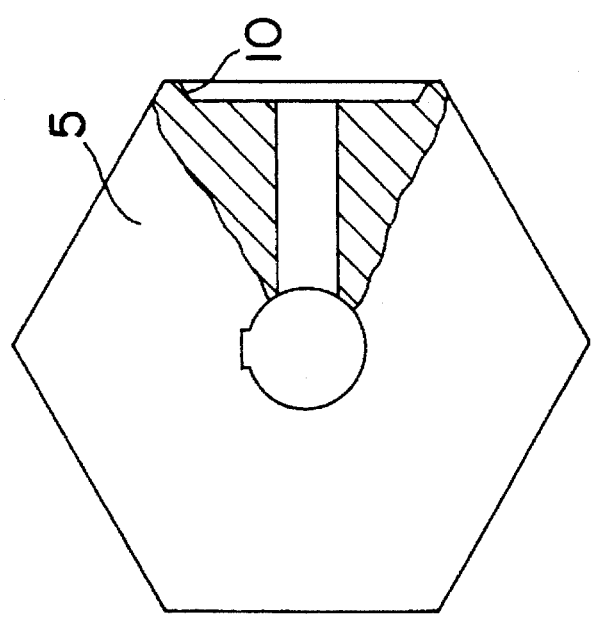
FIG. 5A represents the view of a further variant in a partial transverse section.

If it were desired to obtain blades 7 having the same plane among themselves beyond which can be the combination of the hole/diameter or the screw/tolerance of the hole relative to the attachment, the L-shaped element 1 of the blade 7 can be connected to the hub 5 by a conical seat which can be:

1) obtained in the hub 5 with a protrusion 9 of the L-shaped element 1 which is coupled with a notch 10 of the hub 5 (FIG. 5A and 5B);

2) a conical protrusion 11 of the surface of the hub 5 and a concave conical surface 12 connected with it and placed into the L-shaped element 1 (FIG. 4A and 4B).

It is clear that in the case of conical surfaces, hole 3 made in the L-shaped element 1 must be coaxial to the crown 6 with the loss of the variability of the fitting of the blade 7 in the stopped position.

Figure 6:
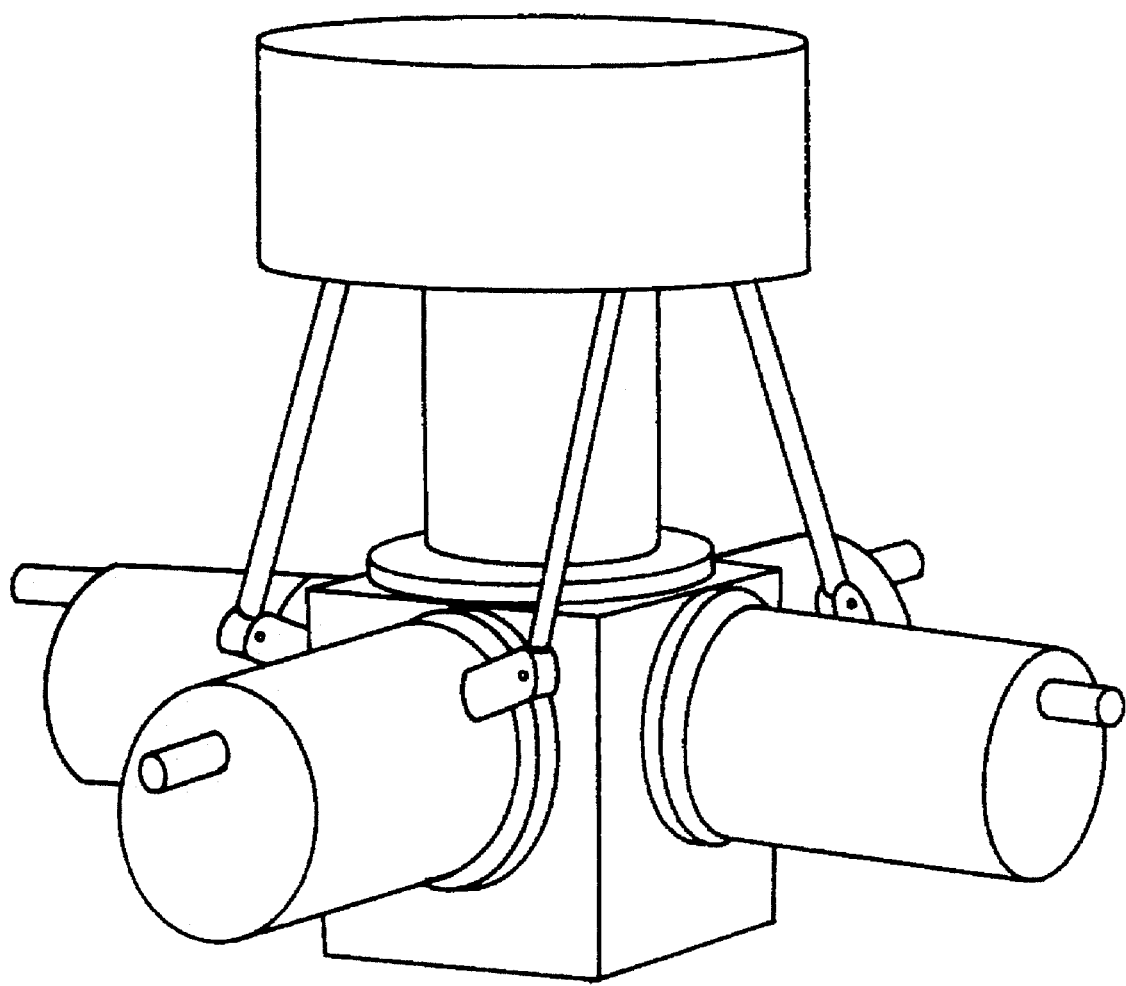
FIG. 6 represents an additional device for varying the passage of the propeller in motion.

The blade-hub connection in the two versions with the circular crown 6 or with conical seat can be used to connect the blades 7 of axial propellers to mechanisms with variation of the fitting with propellers in motion (FIG. 6) (which does not place limits on other possible configurations).

In such a case, the blade-mechanism can be adjusted at the time of setting up.

I claim:

1. A device for connecting a blade (7) to a hub (5) in a propeller of one of a fan and an aircraft, with a variable fitting in at least a moving position, comprising:

an L-shaped means (1) for connecting the blade (7) to the hub (5) so that an attachment of the blade (7) to the hub (5) has a longitudinal axis eccentric with respect to a longitudinal axis of the hub (5), said L-shaped means (1) having a first long leg aligned parallel with a longitudinal axis of the blade (7), said L-shaped means (1) also having a second short leg aligned perpendicular to a flat plane of the blade (7) but parallel to a rotational axis of the hub (5);

a screw means (4) for fastening the second short leg of the L-shaped means (1) to the hub (5), said screw means (4) being aligned parallel to the flat plane of the blade (7) but having a longitudinal axis spaced from the flat plane of the blade (7); and a circular crown means (6) for pressing the L-shaped means (1) to the hub (5).

2. A device according to claim 1, further comprising:

a hole means (3) for retaining the screw means (4) that fastens the second short leg of the L-shaped means (1) to the hub (5);

whereby said hole means (3) is eccentric with respect to the crown means (6).

3. A device according to claim 2, wherein:

said hole means (3) and said screw means (4) have an eccentricity (e) with respect to a longitudinal axis of the crown means (6) that is not less than 10% of an exterior diameter of the crown means (6).

4. A device according to claim 1, wherein:

said L-shaped means (1) has a conical protrusion (9) at one end; and said hub (5) has a notch (10) in one side;

whereby the conical protrusion (9) and the notch (10) are coupled together so that the L-shaped means (1) is connected to the hub (5).

5. A device according to claim 1, wherein:

said L-shaped means (1) has a concave conically notched surface (12) at one end; and said hub (5) has a conical protrusion (11) in one side;

whereby the concave conically notched surface (12) and the conical protrusion (11) are coupled together so that the L-shaped means (1) is connected to the hub (5).

* * * * *